(12) United States Patent
Pang et al.

(10) Patent No.: US 10,314,013 B2
(45) Date of Patent: Jun. 4, 2019

(54) TERMINAL, NETWORK DEVICE, AND DATA TRANSMISSION METHOD IN RANDOM ACCESS PROCESS

(71) Applicant: Huawei Technologies Co., Ltd., Shenzhen (CN)

(72) Inventors: Lingli Pang, Shanghai (CN); Xiaoxiao Zheng, Shanghai (CN); Xudong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 15/650,625

(22) Filed: Jul. 14, 2017

(65) Prior Publication Data

US 2017/0318562 A1 Nov. 2, 2017

Related U.S. Application Data

(63) Continuation of application No. PCT/CN2015/070677, filed on Jan. 14, 2015.

(51) Int. Cl.
*H04W 72/04* (2009.01)
*H04W 74/08* (2009.01)
*H04W 74/00* (2009.01)

(52) U.S. Cl.
CPC ....... *H04W 72/04* (2013.01); *H04W 74/0833* (2013.01); *H04W 74/00* (2013.01)

(58) Field of Classification Search
CPC .. H04W 72/04; H04W 74/0833; H04W 74/00
See application file for complete search history.

(56) References Cited

U.S. PATENT DOCUMENTS 9,769,851 B2 * 9/2017 Baldemair ........ H04W 74/0833
2010/0002590 A1 1/2010 Park et al.
(Continued)

FOREIGN PATENT DOCUMENTS

CN 101772175 A 7/2010
CN 101803234 A 8/2010
(Continued)

OTHER PUBLICATIONS

"$3^{rd}$ Generation Partnership Project; Technical Specification Group Radio Access Network; Radio Resource Control (RRC); Protocol specification (Release 12)," 3GPP TS 25.331, V12.4.0, pp. 1-2223, $3^{rd}$ Generation Partnership Project, Valbonne, France (Dec. 2014).
(Continued)

*Primary Examiner* — Habte Mered
(74) *Attorney, Agent, or Firm* — Leydig, Voit & Mayer, Ltd.

(57) ABSTRACT

The present invention relates to wireless communications technologies, and in particular, to a terminal, a network device, and a data transmission method in a random access process, so as to resolve a current problem that a transmission delay is relatively long when a terminal transmits a relatively large data packet in a random access process. In the terminal a processing module, is configured to determine that the terminal transmits data of multiple TTIs to a base station in a current random access process; and a transceiver module is configured to send first indication information to the base station, where the first indication information is used to indicate that the terminal transmits the data of the multiple TTIs in the current random access process. In this way, the terminal can transmit data of multiple TTIs in one random access process.

15 Claims, 5 Drawing Sheets

S1201

A terminal determines to transmit data of multiple TTIs to a base station in a current random access process

S1202

The terminal sends first indication information to the base station, where the first indication information is used to indicate that the terminal transmits the data of the multiple TTIs in the current random access process

(56) References Cited

U.S. PATENT DOCUMENTS

| | | | |
|---|---|---|---|
| 2010/0067412 A1* | 3/2010 | Kitazoe | H04L 1/1812 370/294 |
| 2010/0220623 A1* | 9/2010 | Cave | H04L 1/0007 370/252 |
| 2010/0278064 A1* | 11/2010 | Jeong | H04L 43/0829 370/252 |
| 2011/0032889 A1* | 2/2011 | Lee | H04W 74/006 370/329 |
| 2011/0075621 A1 | 3/2011 | Sung et al. | |
| 2011/0280212 A1* | 11/2011 | Lv | H04W 74/002 370/329 |
| 2012/0063393 A1* | 3/2012 | Du | H04W 36/0077 370/329 |
| 2012/0147830 A1* | 6/2012 | Lohr | H04W 72/042 370/329 |
| 2013/0003659 A1* | 1/2013 | Iwai | H04L 5/0007 370/328 |
| 2013/0058315 A1* | 3/2013 | Feuersanger | H04W 52/281 370/336 |
| 2014/0334448 A1* | 11/2014 | Langereis | H04W 36/0072 370/331 |
| 2015/0365977 A1* | 12/2015 | Tabet | H04J 13/0062 370/330 |
| 2016/0143059 A1* | 5/2016 | Jha | H04W 76/10 370/329 |
| 2016/0192398 A1* | 6/2016 | Wang | H04W 74/0833 370/329 |
| 2016/0255591 A1* | 9/2016 | Park | H04W 4/70 455/522 |
| 2017/0171764 A1* | 6/2017 | Dimou | H04W 4/70 |
| 2018/0242354 A1* | 8/2018 | Takeda | H04W 72/04 |

FOREIGN PATENT DOCUMENTS

| | | |
|---|---|---|
| CN | 102124774 A | 7/2011 |
| CN | 102422568 A | 4/2012 |
| CN | 102917437 A | 2/2013 |
| WO | 2010075823 A1 | 7/2010 |

OTHER PUBLICATIONS

CN 201580001955.1OA, Office Action, dated Jan. 30, 2019.

* cited by examiner

TERMINAL, NETWORK DEVICE, AND DATA TRANSMISSION METHOD IN RANDOM ACCESS PROCESS

CROSS-REFERENCE TO RELATED APPLICATIONS

This application is a continuation of International Application No. PCT/CN2015/070677, filed on Jan. 14, 2015, the disclosure of which is hereby incorporated by reference in its entirety.

TECHNICAL FIELD

The present invention relates to wireless communications technologies, and in particular, to a terminal, a network device, and a data transmission method in a random access process.

BACKGROUND

In wireless communication, a terminal can transmit data by using a random access process. Using a universal mobile telecommunications system (UMTS) as an example, in a random access process, after a user equipment (UE) that acts as a terminal sends an access signature by using a physical random access channel (PRACH), the user equipment parses an acquisition indicator channel (AICH) at a corresponding time point to obtain a random access result.

Currently, in the UMTS system, if the user equipment receives a positive feedback (i.e. ACK) sent by using the AICH, the user equipment can send data of only one transmission time interval (TTI) on a resource obtained by means of contention.

As shown in FIG. 1, a preamble is generated by using a signature, and the signature is the access signature that is selected by the user equipment when the user equipment initiates the random access process on the PRACH. A message part is the data that is actually sent by the user equipment after the user equipment obtains the ACK from the AICH. A length of the TTI may be 10 ms or 20 ms.

After random access, the user equipment can send data of only one TTI. Due to a limited amount of data, if the user equipment needs to send a relatively large data packet, the user equipment needs to perform multiple random access processes to transmit data of multiple TTIs. In this way, a transmission delay of the data packet is increased.

In conclusion, currently, in a random access process, if a terminal needs to transmit a relatively large data packet, a transmission delay is relatively long.

SUMMARY

Embodiments of the present invention provide a terminal, a network device, and a data transmission method in a random access process, so as to resolve a current problem that a transmission delay is relatively long when a terminal transmits a relatively large data packet in a random access process.

According to a first aspect, an embodiment of the present invention provides a terminal, including:

a processing module, configured to determine that the terminal transmits data of multiple transmission time intervals (TTIs) to a base station in a current random access process; and a transceiver module, configured to send first indication information to the base station, where the first indication information is used to indicate that the terminal transmits the data of the multiple TTIs in the current random access process.

With reference to the first aspect, in a first possible implementation manner, the first indication information is further used to indicate that:

the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

With reference to the first possible implementation manner of the first aspect, in a second possible implementation manner, the first indication information is sent by using a dedicated physical control channel (DPCCH).

With reference to the first aspect, in a third possible implementation manner, the transceiver module is further configured to:

send second indication information to the base station, where the second indication information is used to indicate that:

the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

With reference to the third possible implementation manner of the first aspect, in a fourth possible implementation manner, the second indication information is sent by using a dedicated physical control channel (DPCCH).

With reference to the first possible implementation manner of the first aspect, in a fifth possible implementation manner, if the first indication information is further used to indicate that the multiple TTIs are specifically X TTIs, the transceiver module is specifically configured to send the first indication information when the terminal sends an access preamble to the base station, where the first indication information further includes: information about a physical resource that is used by the terminal to send the access preamble, to instruct the base station to determine, according to a first correspondence, that the terminal transmits data of the X TTIs in the current random access process; and the first correspondence includes: a correspondence between the information about the physical resource that is used by the terminal to send the access preamble and X.

With reference to the first possible implementation manner of the first aspect, in a sixth possible implementation manner, if the first indication information is further used to indicate that the multiple TTIs are specifically X TTIs, the first indication information includes first sub information and second sub information;

the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where $M*N=X$, and $M$ and $N$ are positive integers.

With reference to the sixth possible implementation manner of the first aspect, in a seventh possible implementation manner, the transceiver module is specifically configured to:

send the first sub information when the terminal sends an access preamble to the base station, and send the second sub information to the base station when the terminal transmits the data of the multiple TTIs; or send the second sub information when the terminal sends an access preamble to the base station, and send the first sub information to the base station when the terminal transmits the data of the multiple TTIs.

With reference to the seventh possible implementation manner of the first aspect, in an eighth possible implementation manner, if the transceiver module sends the first sub information when the terminal sends the access preamble to the base station, the first sub information further includes: information about a physical resource that is used by the terminal to send the access preamble; or if the transceiver module sends the second sub information when the terminal sends the access preamble to the base station, the second sub information further includes: information about a physical resource that is used by the terminal to send the access preamble.

With reference to the eighth possible implementation manner of the first aspect, in a ninth possible implementation manner, if the transceiver module sends the first sub information when the terminal sends the access preamble to the base station, the first sub information is further used to instruct the base station to determine, according to a second correspondence, that the terminal transmits M data packets to the base station in the current random access process, and the second correspondence includes: a correspondence between information about a physical resource that is used by the terminal to send an access preamble and a quantity of data packets that are transmitted by the terminal to the base station in one random access process; or if the transceiver module sends the second sub information when the terminal sends the access preamble to the base station, the second sub information is further used to instruct the base station to determine, according to a third correspondence, that each data packet that is transmitted by the terminal to the base station is repeatedly transmitted for N times in the current random access process, and the third correspondence includes: a correspondence between information about a physical resource that is used by the terminal to send an access preamble and a quantity of times of repeatedly transmitting, by the terminal in one random access process, each data packet that is transmitted by the terminal to the base station.

With reference to the seventh possible implementation manner, the eighth possible implementation manner, or the ninth possible implementation manner of the first aspect, in a tenth possible implementation manner, if the transceiver module sends the second sub information when the terminal transmits the data of the multiple TTIs to the base station, the second sub information is sent by using a DPCCH; or if the transceiver module sends the first sub information when the terminal transmits the data of the multiple TTIs to the base station, the first sub information is sent by using a DPCCH.

With reference to any one of the first aspect or the first to the tenth possible implementation manners of the first aspect, in an eleventh possible implementation manner, the transceiver module is further configured to: before sending the first indication information to the base station, receive third indication information that is sent by a radio network controller (RNC) configured to control the base station, where the third indication information is used to indicate that the terminal is allowed to transmit data of multiple TTIs in the current random access process.

With reference to the eleventh possible implementation manner of the first aspect, in a twelfth possible implementation manner, the third indication information includes at least one of the following information:

a maximum quantity of TTIs that the terminal is allowed to transmit in one random access process;

indication information indicating that the terminal is allowed to transmit data of multiple TTIs in one random access process;

a data volume threshold;

information about a physical resource that is available when the terminal needs to send data of multiple TTIs in one random access process; or a correspondence between information about a physical resource that is used by the terminal to send an access preamble and a TTI quantity of multiple TTIs that are transmitted by the terminal in one random access process.

With reference to the twelfth possible implementation manner of the first aspect, in a thirteenth possible implementation manner, the processing module is specifically configured to: determine, when one or more of the following conditions are met, to transmit the data of the multiple TTIs to the base station in the current random access process:

an amount of data buffered in the terminal is greater than or equal to the data volume threshold;

a path loss from the terminal to the base station is less than or equal to a preset path loss threshold; or load of a cell in which the terminal is located is less than or equal to a preset cell load threshold.

With reference to the fifth possible implementation manner, the eighth possible implementation manner, the ninth possible implementation manner, the twelfth possible implementation manner, or the thirteenth possible implementation manner of the first aspect, in a fourteenth possible implementation manner, the information about the physical resource that is used by the terminal to send the access preamble includes at least one of the following three pieces of information:

an access signature that is sent by the terminal to the base station;

a PRACH code channel that is used by the terminal to send the access preamble to the base station; or an access timeslot that is used by the terminal to send the access preamble to the base station.

According to a second aspect, an embodiment of the present invention provides a base station, including:

a receiving module, configured to receive first indication information sent by a terminal, where the first indication information is used to indicate to the base station that the terminal transmits data of multiple TTIs in one random access process; and a processing module, configured to determine, according to the first indication information, that the terminal transmits data of multiple TTIs in a current random access process.

With reference to the second aspect, in a first possible implementation manner, the first indication information is further used to indicate that:

the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

With reference to the first possible implementation manner of the second aspect, in a second possible implementation manner, the first indication information is sent by using a dedicated physical control channel (DPCCH).

With reference to the second aspect, in a third possible implementation manner, the receiving module is further configured to:

receive second indication information sent by the terminal, where the second indication information is used to indicate that:

the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

With reference to the third possible implementation manner of the second aspect, in a fourth possible implementation manner, the second indication information is sent by using a dedicated physical control channel (DPCCH).

With reference to the first possible implementation manner of the second aspect, in a fifth possible implementation manner, if the first indication information is further used to indicate that the multiple TTIs are specifically X TTIs, the receiving module is specifically configured to receive the first indication information when the base station receives an access preamble sent by the terminal;

the first indication information further includes: information about a physical resource that is used by the terminal to send the access preamble, and the processing module is specifically configured to:

determine, according to a first correspondence, that the terminal transmits data of the X TTIs in the current random access process, where the first correspondence includes: a correspondence between the information about the physical resource that is used by the terminal to send the access preamble and X.

With reference to the fifth possible implementation manner of the second aspect, in a sixth possible implementation manner, the receiving module is further configured to:

before receiving the first indication information sent by the terminal, receive information that is about the first correspondence and that is sent by a radio network controller (RNC) configured to control the base station.

With reference to the first possible implementation manner of the second aspect, in a seventh possible implementation manner, if the first indication information is further used to indicate that the multiple TTIs are specifically X TTIs, the first indication information includes first sub information and second sub information;

the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where $M*N=X$, and $M$ and $N$ are positive integers.

With reference to the seventh possible implementation manner of the second aspect, in an eighth possible implementation manner, the receiving module is specifically configured to:

receive the first sub information when the base station receives an access preamble sent by the terminal, and receive the second sub information when the base station receives the data of the multiple TTIs that is sent by the terminal; or receive the second sub information when the base station receives an access preamble sent by the terminal, and receive the first sub information when the base station receives the data of the multiple TTIs that is sent by the terminal.

With reference to the eighth possible implementation manner of the second aspect, in a ninth possible implementation manner, if the receiving module receives the first sub information when the base station receives the access preamble sent by the terminal, the first sub information further includes: information about a physical resource that is used by the terminal to send the access preamble; or if the receiving module receives the second sub information when the base station receives the access preamble sent by the terminal, the second sub information further includes: information about a physical resource that is used by the terminal to send the access preamble.

With reference to the ninth possible implementation manner of the second aspect, in a tenth possible implementation manner, if the receiving module receives the first sub information when the base station receives the access preamble sent by the terminal, the processing module is specifically configured to determine, according to a second correspondence, that the terminal transmits M data packets to the base station in the current random access process, where the second correspondence includes: a correspondence between information about a physical resource that is used by the terminal to send an access preamble and a quantity of data packets that are transmitted by the terminal to the base station in one random access process; or if the receiving module receives the second sub information when the base station receives the access preamble sent by the terminal, the processing module is specifically configured to determine, according to a third correspondence, that each data packet that is transmitted by the terminal to the base station is repeatedly transmitted for N times in the current random access process, where the third correspondence includes: a correspondence between information about a physical resource that is used by the terminal to send an access preamble and a quantity of times of repeatedly transmitting, by the terminal in one random access process, each data packet that is transmitted by the terminal to the base station.

With reference to the tenth possible implementation manner of the second aspect, in an eleventh possible implementation manner, if the receiving module receives the first sub information when the base station receives the access preamble sent by the terminal, the receiving module is further configured to: before receiving the first sub information, receive information that is about the second correspondence and that is sent by an RNC configured to control the base station, and the processing module is further configured to determine the second correspondence according to the information that is about the second correspondence and that is received by the receiving module; or if the receiving module receives the second sub information when the base station receives the access preamble sent by the terminal, the receiving module is further configured to: before receiving the second sub information, receive information that is about the third correspondence and that is sent by an RNC configured to control the base station, and the processing module is further configured to determine the third correspondence according to the information that is about the third correspondence and that is received by the receiving module.

With reference to any one of the eighth to the eleventh possible implementation manners of the second aspect, in a twelfth possible implementation manner, if the receiving module receives the second sub information when the base station receives the data of the multiple TTIs that is sent by the terminal, the second sub information is sent by the terminal by using a DPCCH; or if the receiving module receives the first sub information when the base station receives the data of the multiple TTIs that is sent by the terminal, the first sub information is sent by the terminal by using a DPCCH.

With reference to the fifth possible implementation manner, the sixth possible implementation manner, the ninth possible implementation manner, the tenth possible implementation manner, or the eleventh possible implementation manner of the second aspect, in a thirteenth possible implementation manner, the information about the physical resource that is used by the terminal to send the access preamble includes at least one of the following three pieces of information:

an access signature that is sent by the terminal to the base station;

a PRACH code channel that is used by the terminal to send the access preamble to the base station; or an access timeslot that is used by the terminal to send the access preamble to the base station.

With reference to any one of the second aspect or the first to the thirteenth possible implementation manners of the second aspect, in a fourteenth possible implementation manner, the processing module is further configured to: after determining, according to the first indication information, that the terminal transmits the data of the multiple TTIs in the current random access process, when the terminal transmits the data of the multiple TTIs, skip allocating, to another terminal, a code channel that is used by the terminal to transmit the data of the multiple TTIs.

According to a third aspect, an embodiment of the present invention provides a radio network controller (RNC), including:

a processing module, configured to determine to allow a terminal to transmit data of multiple TTIs in one random access process; and a sending module, configured to send third indication information to the terminal, where the third indication information is used to indicate that the terminal is allowed to transmit data of multiple TTIs in a current random access process.

With reference to the third aspect, in a first possible implementation manner, the third indication information includes at least one of the following information:

a maximum quantity of TTIs that the terminal is allowed to transmit in one random access process;

indication information indicating that the terminal is allowed to transmit data of multiple TTIs in one random access process;

a data volume threshold;

a correspondence between information about a physical resource that is used by the terminal to send an access preamble and a TTI quantity of multiple TTIs that are transmitted by the terminal in one random access process; or information about a physical resource that is available when the terminal needs to send data of multiple TTIs in one random access process.

According to a fourth aspect, an embodiment of the present invention provides a data transmission method in a random access process, including:

determining, by a terminal, to transmit data of multiple transmission time intervals (TTIs) to a base station in a current random access process; and sending, by the terminal, first indication information to the base station, where the first indication information is used to indicate that the terminal transmits the data of the multiple TTIs in the current random access process.

With reference to the fourth aspect, in a first possible implementation manner, the first indication information is further used to indicate that:

the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

With reference to the first possible implementation manner of the fourth aspect, in a second possible implementation manner, the first indication information is sent by using a dedicated physical control channel (DPCCH).

With reference to the fourth aspect, in a third possible implementation manner, the method further includes:

sending, by the terminal, second indication information to the base station, where the second indication information is used to indicate that:

the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

With reference to the third possible implementation manner of the fourth aspect, in a fourth possible implementation manner, the second indication information is sent by using a dedicated physical control channel (DPCCH).

With reference to the first possible implementation manner of the fourth aspect, in a fifth possible implementation manner, if the first indication information is further used to indicate that the multiple TTIs are specifically X TTIs, the sending, by the terminal, the first indication information to the base station includes: sending, by the terminal, the first indication information when the terminal sends an access preamble to the base station, where the first indication information further includes: information about a physical resource that is used by the terminal to send the access preamble, to instruct the base station to determine, according to a first correspondence, that the terminal transmits data of the X TTIs in the current random access process; and the first correspondence includes: a correspondence between the information about the physical resource that is used by the terminal to send the access preamble and X.

With reference to the first possible implementation manner of the fourth aspect, in a sixth possible implementation manner, if the first indication information is further used to indicate that the multiple TTIs are specifically X TTIs, the first indication information includes first sub information and second sub information;

the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where $M*N=X$, and $M$ and $N$ are positive integers.

With reference to the sixth possible implementation manner of the fourth aspect, in a seventh possible implementation manner, the sending, by the terminal, first indication information to the base station includes:

sending, by the terminal, the first sub information when the terminal sends an access preamble to the base station, and sending the second sub information to the base station when the terminal transmits the data of the multiple TTIs; or sending, by the terminal, the second sub information when the terminal sends an access preamble to the base station, and sending the first sub information to the base station when the terminal transmits the data of the multiple TTIs.

With reference to the seventh possible implementation manner of the fourth aspect, in an eighth possible implementation manner, if the terminal sends the first sub information when the terminal sends the access preamble to the base station, the first sub information further includes: information about a physical resource that is used by the terminal to send the access preamble; or if the terminal sends the second sub information when the terminal sends the access preamble to the base station, the second sub information further includes: information about a physical resource that is used by the terminal to send the access preamble.

With reference to the eighth possible implementation manner of the fourth aspect, in a ninth possible implementation manner, if the terminal sends the first sub information when the terminal sends the access preamble to the base station, the first sub information is further used to instruct the base station to determine, according to a second correspondence, that the terminal transmits M data packets to the base station in the current random access process, and the second correspondence includes: a correspondence between information about a physical resource that is used by the terminal to send an access preamble and a quantity of data packets that are transmitted by the terminal to the base station in one random access process; or if the terminal sends the second sub information when the terminal sends the access preamble to the base station, the second sub information is further used to instruct the base station to determine, according to a third correspondence, that each data packet that is transmitted by the terminal to the base station is repeatedly transmitted for N times in the current random access process, and the third correspondence includes: a correspondence between information about a physical resource that is used by the terminal to send an access preamble and a quantity of times of repeatedly transmitting, by the terminal in one random access process, each data packet that is transmitted by the terminal to the base station.

With reference to the seventh possible implementation manner, the eighth possible implementation manner, or the ninth possible implementation manner of the fourth aspect, in a tenth possible implementation manner, if the terminal sends the second sub information when the terminal transmits the data of the multiple TTIs to the base station, the second sub information is sent by using a DPCCH; or if the terminal sends the first sub information when the terminal transmits the data of the multiple TTIs to the base station, the first sub information is sent by using a DPCCH.

With reference to any one of the fourth aspect or the first to the tenth possible implementation manners of the fourth aspect, in an eleventh possible implementation manner, before the sending, by the terminal, the first indication information to the base station, the method further includes:

receiving, by the terminal, third indication information that is sent by a radio network controller (RNC) configured to control the base station, where the third indication information is used to indicate that the terminal is allowed to transmit data of multiple TTIs in the current random access process.

With reference to the eleventh possible implementation manner of the fourth aspect, in a twelfth possible implementation manner, the third indication information includes at least one of the following information:

a maximum quantity of TTIs that the terminal is allowed to transmit in one random access process;

indication information indicating that the terminal is allowed to transmit data of multiple TTIs in one random access process;

a data volume threshold;

information about a physical resource that is available when the terminal needs to send data of multiple TTIs in one random access process; or a correspondence between information about a physical resource that is used by the terminal to send an access preamble and a TTI quantity of multiple TTIs that are transmitted by the terminal in one random access process.

With reference to the twelfth possible implementation manner of the fourth aspect, in a thirteenth possible implementation manner, the determining, by a terminal, to transmit data of multiple TTIs to a base station in a current random access process specifically includes:

after receiving the third indication information, determining, by the terminal when one or more of the following conditions are met, to transmit the data of the multiple TTIs to the base station in the current random access process:

an amount of data buffered in the terminal is greater than or equal to the data volume threshold;

a path loss from the terminal to the base station is less than or equal to a preset path loss threshold; or load of a cell in which the terminal is located is less than or equal to a preset cell load threshold.

With reference to the fifth possible implementation manner, the eighth possible implementation manner, the ninth possible implementation manner, the twelfth possible implementation manner, or the thirteenth possible implementation manner of the fourth aspect, in a fourteenth possible implementation manner, the information about the physical resource that is used by the terminal to send the access preamble includes at least one of the following three pieces of information:

an access signature that is sent by the terminal to the base station;

a PRACH code channel that is used by the terminal to send the access preamble to the base station; or an access timeslot that is used by the terminal to send the access preamble to the base station.

According to a fifth aspect, an embodiment of the present invention provides a data transmission method, including:

receiving, by a base station, first indication information sent by a terminal, where the first indication information is used to indicate that the terminal transmits data of multiple TTIs in one random access process; and determining, by the base station according to the first indication information, that the terminal transmits data of multiple TTIs in a current random access process.

With reference to the fifth aspect, in a first possible implementation manner, the first indication information is further used to indicate that:

the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

With reference to the first possible implementation manner of the fifth aspect, in a second possible implementation manner, the first indication information is sent by using a dedicated physical control channel (DPCCH).

With reference to the fifth aspect, in a third possible implementation manner, the method further includes:

receiving, by the base station, second indication information sent by the terminal, where the second indication information is used to indicate that:

the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

With reference to the third possible implementation manner of the fifth aspect, in a fourth possible implementation manner, the second indication information is sent by using a dedicated physical control channel (DPCCH).

With reference to the first possible implementation manner of the fifth aspect, in a fifth possible implementation manner, if the first indication information is further used to indicate that the multiple TTIs are specifically X TTIs, the receiving, by a base station, the first indication information includes: receiving, by the base station, the first indication information when the base station receives an access preamble sent by the terminal;

the first indication information further includes: information about a physical resource that is used by the terminal to send the access preamble, and the determining, by the base station according to the first indication information, that the terminal continuously transmits data of multiple TTIs in a current random access process includes:

determining, by the base station according to a first correspondence, that the terminal transmits data of the X TTIs in the current random access process, where the first correspondence includes: a correspondence between the information about the physical resource that is used by the terminal to send the access preamble and X.

With reference to the fifth possible implementation manner of the fifth aspect, in a sixth possible implementation manner, before the receiving, by a base station, first indication information sent by the terminal, the method further includes:

receiving, by the base station, information that is about the first correspondence and that is sent by a radio network controller (RNC) configured to control the base station.

With reference to the first possible implementation manner of the fifth aspect, in a seventh possible implementation manner, if the first indication information is further used to indicate that the multiple TTIs are specifically X TTIs, the first indication information includes first sub information and second sub information;

the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where $M*N=X$, and $M$ and $N$ are positive integers.

With reference to the seventh possible implementation manner of the fifth aspect, in an eighth possible implementation manner, the receiving, by a base station, the first indication information includes:

receiving, by the base station, the first sub information when the base station receives an access preamble sent by the terminal, and receiving the second sub information when the base station receives the data of the multiple TTIs that is sent by the terminal; or receiving, by the base station, the second sub information when the base station receives an access preamble sent by the terminal, and receiving the first sub information when the base station receives the data of the multiple TTIs that is sent by the terminal.

With reference to the eighth possible implementation manner of the fifth aspect, in a ninth possible implementation manner, if the base station receives the first sub information when the base station receives the access preamble sent by the terminal, the first sub information further includes: information about a physical resource that is used by the terminal to send the access preamble; or if the base station receives the second sub information when the base station receives the access preamble sent by the terminal, the second sub information further includes: information about a physical resource that is used by the terminal to send the access preamble.

With reference to the ninth possible implementation manner of the fifth aspect, in a tenth possible implementation manner, if the base station receives the first sub information when the base station receives the access preamble sent by the terminal, the determining, by the base station according to the first indication information, that the terminal transmits data of multiple TTIs in a current random access process includes: determining, by the base station according to a second correspondence, that the terminal transmits M data packets to the base station in the current random access process, where the second correspondence includes: a correspondence between information about a physical resource that is used by the terminal to send an access preamble and a quantity of data packets that are transmitted by the terminal to the base station in one random access process; or if the base station receives the second sub information when the base station receives the access preamble sent by the terminal, the determining, by the base station according to the first indication information, that the terminal transmits data of multiple TTIs in a current random access process includes: determining, by the base station according to a third correspondence, that each data packet that is transmitted by the terminal to the base station is repeatedly transmitted for N times in the current random access process, where the third correspondence includes: a correspondence between information about a physical resource that is used by the terminal to send an access preamble and a quantity of times of repeatedly transmitting, by the terminal in one random access process, each data packet that is transmitted by the terminal to the base station.

With reference to the tenth possible implementation manner of the fifth aspect, in an eleventh possible implementation manner, if the base station receives the first sub information when the base station receives the access preamble sent by the terminal, before the receiving, by the base station, the first sub information, the method further includes:

receiving, by the base station, information that is about the second correspondence and that is sent by an RNC configured to control the base station, and determining, by the base station, the second correspondence according to the received information about the second correspondence; or if the base station receives the second sub information when the base station receives the access preamble sent by the terminal, before the receiving, by the base station, the second sub information, the method further includes:

receiving, by the base station, information that is about the third correspondence and that is sent by an RNC configured to control the base station, and determining, by the base station, the third correspondence according to the received information about the third correspondence.

With reference to any one of the eighth to the eleventh possible implementation manners of the fifth aspect, in a twelfth possible implementation manner, if the base station receives the second sub information when the base station receives the data of the multiple TTIs that is sent by the terminal, the second sub information is sent by the terminal by using a DPCCH; or if the base station receives the first sub information when the base station receives the data of the multiple TTIs that is sent by the terminal, the first sub information is sent by the terminal by using a DPCCH.

With reference to the fifth possible implementation manner, the sixth possible implementation manner, the ninth possible implementation manner, the tenth possible implementation manner, or the eleventh possible implementation manner of the fifth aspect, in a thirteenth possible implementation manner, the information about the physical resource that is used by the terminal to send the access preamble includes at least one of the following three pieces of information:

an access signature that is sent by the terminal to the base station;

a PRACH code channel that is used by the terminal to send the access preamble to the base station; or an access timeslot that is used by the terminal to send the access preamble to the base station.

With reference to any one of the fifth aspect or the first to the thirteenth possible implementation manners of the fifth aspect, in fourteenth possible implementation manner, after the determining, by the base station according to the first indication information, that the terminal transmits the data of the multiple TTIs in a current random access process, the method further includes:

when the terminal transmits the data of the multiple TTIs, skipping allocating, by the base station to another terminal, a code channel that is used by the terminal to transmit the data of the multiple TTIs.

According to a sixth aspect, an embodiment of the present invention provides a method for sending indication information, including:

determining, by a radio network controller (RNC), to allow a terminal to transmit data of multiple TTIs in one random access process; and sending, by the RNC, third indication information to the terminal, where the third indication information is used to indicate that the terminal is allowed to transmit data of multiple TTIs in a current random access process.

With reference to the sixth aspect, in a first possible implementation manner, the third indication information includes at least one of the following information:

a maximum quantity of TTIs that the terminal is allowed to transmit in one random access process;

indication information indicating that the terminal is allowed to transmit data of multiple TTIs in one random access process;

a data volume threshold;

a correspondence between information about a physical resource that is used by the terminal to send an access preamble and a TTI quantity of multiple TTIs that are transmitted by the terminal in one random access process; or information about a physical resource that is available when the terminal needs to send data of multiple TTIs in one random access process.

In the embodiments of the present invention, a terminal sends first indication information to a base station, to indicate that the terminal transmits data of multiple TTIs in a current random access process, and the base station determines, according to the received first indication information, that the terminal transmits the data of the multiple TTIs in the current random access process. In this way, the terminal can transmit data of multiple TTIs in one random access process.

Further, when the terminal transmits the data of the multiple TTIs, the base station may not allocate, to another terminal, a code channel that is used by the terminal to transmit the data of the multiple TTIs, so as to ensure data transmission of the terminal.

Further, before sending the first indication information to the base station, the terminal may receive third indication information sent by a radio network controller (RNC). The third indication information is used to indicate that the terminal is allowed to transmit data of multiple TTIs in the current random access process. After the terminal receives the third indication information, when determining that the data of the multiple TTIs needs to be transmitted to the base station in the current random access process, the terminal sends the first indication information to the base station.

DESCRIPTION OF EMBODIMENTS

Embodiments of the present invention provide a terminal, a network device, and a data transmission method in a random access process, so as to resolve a current problem that a transmission delay is relatively long when a terminal transmits a relatively large data packet in a random access process.

In the embodiments of the present invention, a terminal sends first indication information to a base station, to indicate that the terminal transmits data of multiple TTIs in a current random access process, and the base station determines, according to the received first indication information, that the terminal transmits the data of the multiple TTIs in the current random access process. In this way, the terminal can transmit data of multiple TTIs in one random access process.

Further, when the terminal transmits the data of the multiple TTIs, the base station may not allocate, to another terminal, a code channel that is used by the terminal to transmit the data of the multiple TTIs, so as to ensure data transmission of the terminal.

Further, before sending the first indication information to the base station, the terminal may receive third indication information sent by an RNC. The third indication information is used to indicate that the terminal is allowed to transmit data of multiple TTIs in the current random access process. After the terminal receives the third indication information, when determining that the data of the multiple TTIs needs to be transmitted to the base station in the current random access process, the terminal sends the first indication information to the base station.

The following describes the embodiments of the present invention in detail with reference to the accompanying drawings. First, a wireless communications system provided in the embodiments of the present invention is described; then, the terminal, the base station, and the radio network controller that are provided in the embodiments of the present invention are described; and finally, the data transmission method in a random access process and a method for sending indication information that are provided in the embodiments of the present invention are described.

Figure 1:
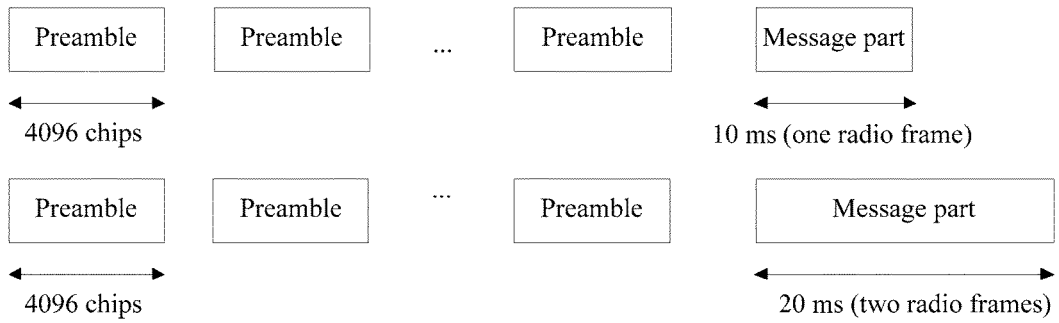
FIG. 1 is a schematic diagram of message parts sent by a user equipment in a random access process and after the random access process.
Figure 2:
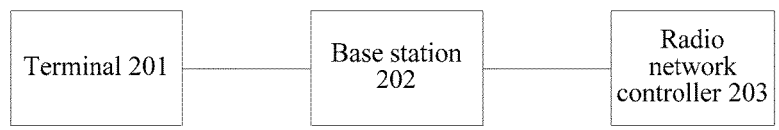
FIG. 2 is a schematic structural diagram of a wireless communications system according to an embodiment of the present invention.

FIG. 2 is a schematic structural diagram of a wireless communications system according to an embodiment of the present invention. As shown in FIG. 2, the wireless communications system includes: a terminal 201, a base station 202 and a radio network controller 203.

The terminal 201 is configured to: receive third indication information sent by a radio network controller 203, where the third indication information indicates that the terminal is allowed to transmit data of multiple TTIs in one random access process, and when determining that data of multiple TTIs needs to be transmitted to a base station 202 in a current random access process, send first indication information to the base station, where the first indication information indicates that the terminal 201 transmits the data of the multiple TTIs in the current random access process;

The base station 202 is configured to: receive the first indication information sent by the terminal 201, and determine, according to the first indication information, that the terminal 201 transmits the data of the multiple TTIs in the current random access process; and The radio network controller 203 is configured to send the third indication information to the terminal 201.

Figure 3:
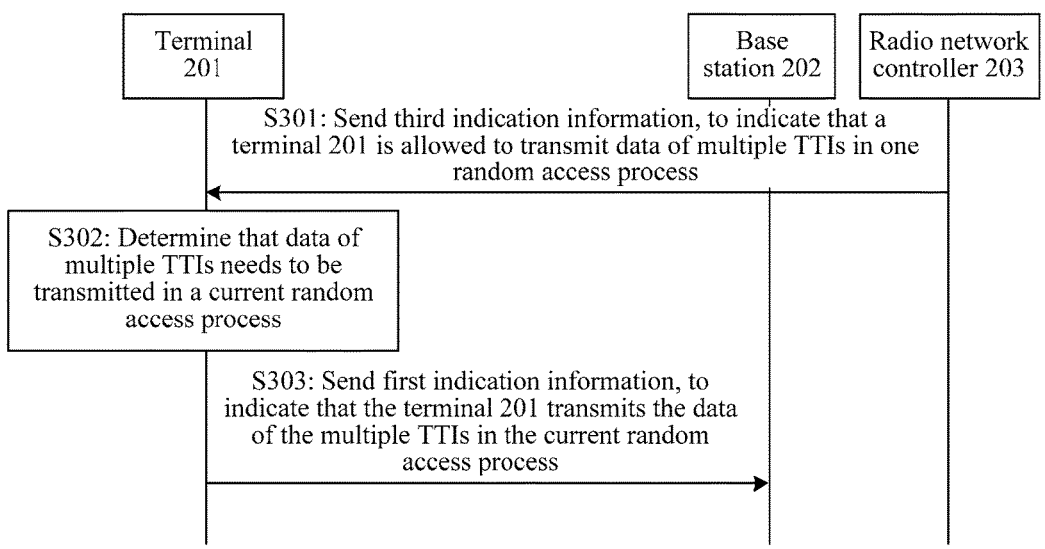
FIG. 3 is a flowchart of message exchange between a terminal, a base station, and an RNC in a wireless communications system according to an embodiment of the present invention.

FIG. 3 is a flowchart of message exchange between the terminal 201, the base station 202, and the radio network controller 203 in the wireless communications system. As shown in FIG. 3, the procedure includes the following steps.

S301: The radio network controller 203 sends third indication information to the terminal 201, to indicate that the terminal 201 is allowed to transmit data of multiple TTIs in one random access process.

S302: The terminal 201 determines that data of multiple TTIs needs to be transmitted in a current random access process.

S303: The terminal 201 sends first indication information to the base station 202, to indicate that the terminal 201 transmits the data of the multiple TTIs in the current random access process.

After receiving the data sent by the terminal 201, the base station 202 processes the received data and forwards the data to the radio network controller 203.

A communications standard of the wireless communications system provided in this embodiment of the present invention may include, but is not limited to, the following communications standards: global system for mobile communications (GSM), time division-synchronous code division multiple access (TD-SCDMA), wideband code division multiple access (WCDMA), time division duplexing-long term evolution (TDD LTE), frequency division duplexing-long term evolution (FDD LTE), and long term evolution-advanced (LTE-advanced).

The terminal 201 may include, but is not limited to, the following types of terminals: a mobile phone, a tablet computer, a personal digital assistant (PDA), a point of sale (POS), and a vehicle-mounted computer.

If the communications standard of the wireless communications system is GSM, the terminal 201 is a mobile station (MS), the base station 202 is a base transceiver station (BTS), and the radio network controller 203 is a base station controller (BSC).

If the communications standard of the wireless communications system is TD-SCDMA or WCDMA, the terminal 201 is a user equipment, the base station 202 is a node B (NB), and the radio network controller 203 is a radio network controller (RNC).

If the communications standard of the wireless communications system is TDD LTE or FDD LTE, because delayering processing is used for a network architecture in an LTE system, the base station and the radio network controller are integrated into an evolved NodeB (eNB), and operations of the base station 202 and the radio network controller 203 may all be completed by the eNB. That is, the eNB sends the third indication information to the terminal 201, and when determining that data of multiple TTIs needs to be transmitted in one random access process, the terminal 201 sends the first indication information to the eNB.

Using that the communications standard of the wireless communications system provided in this embodiment of the present invention is WCDMA as an example, usually when a large data packet is to be sent, the terminal is directly switched to a cell-dedicated channel (CELL_DCH) state, and the data packet is not sent in a random access manner. However, state is switched in this process.

By means of this embodiment of the present invention, data of multiple TTIs can be sent and state switching does not need to be performed, thereby improving the data sending efficiency.

In addition, a resource such as a cell-dedicated channel is occupied when the terminal is switched to the CELL_DCH state. Therefore, by means of this embodiment of the present invention, data can be sent when a cell-dedicated channel resource is not occupied, thereby saving a cell resource.

In addition, signaling transmission is needed for the terminal to be switched to the CELL_DCH state, increasing a probability of a radio link failure of the terminal in a signaling transmission process. Therefore, by means of this embodiment of the present invention, a success rate of sending data by the terminal can be further improved.

In this embodiment of the present invention, an existing data sending mechanism is surpassed, and a random access process is cleverly used to send a large data packet, thereby improving a success rate and efficiency of sending data, and meanwhile, saving a resource such as a cell-dedicated channel.

When sending the third indication information to the terminal 201, the radio network controller 203 may send the indication information with respect to a random access process to be initiated by the terminal 201, or may send the indication information with respect to all random access processes initiated by the terminal 201.

In a possible case, the radio network controller 203 learns, by using a cell update process initiated by the terminal, that a cell in which the terminal 201 is located belongs to the base station 202, and when the radio network controller 203 determines that the base station 202 has a capability of receiving, in one random access process, data of multiple TTIs that is sent by the terminal 201, the radio network controller 203 sends the third indication information to the terminal 201. The radio network controller 203 may send the third indication information in the cell update process initiated by the terminal, or may send the third indication information to the terminal 201 after the cell update process.

In another possible case, when the radio network controller 203 determines that the base station 202 has a capacity of receiving, in one random access process, data of multiple TTIs that is sent by the terminal 201, the radio network controller 203 sends, by using a system message in a cell of the base station 202, the third indication information to the terminal 201 accessing the cell.

The two possible cases described above are only examples, and actual implementation is not limited thereto, as long as the radio network controller 203 can send the third indication information to the terminal 201.

Optionally, the third indication information may include at least one of the following information:

information 1: a maximum quantity of TTIs that the terminal is allowed to transmit in one random access process;

information 2: indication information indicating that the terminal is allowed to transmit data of multiple TTIs in one random access process;

information 3: a data volume threshold;

information 4: a correspondence between information about a physical resource that is used by the terminal to send an access preamble and a TTI quantity of multiple TTIs that are transmitted by the terminal in one random access process; or information 5: information about a physical resource that is used by the terminal to send an access preamble.

Optionally, in information 4 and information 5, "information about a physical resource that is used by the terminal to send an access preamble" may include at least one of the following three pieces of information: an access signature that is sent by the terminal to the base station; a PRACH code channel that is used by the terminal to send the access preamble to the base station; or an access timeslot that is used by the terminal to send the access preamble to the base station.

The several optional implementation manners of "information about a physical resource that is used by the terminal to send an access preamble" are also applicable to other parts in this embodiment of the present invention that relate to "information about a physical resource that is used by the terminal to send an access preamble".

If the third indication information includes information 2 and information 3, when an amount of data that is buffered in the terminal 201 and that needs to be sent in one random access process is greater than the data volume threshold indicated by information 3, the terminal 201 determines that data of multiple TTIs needs to be sent in one random access process.

If the third indication information includes information 4, and the terminal 201 determines that data of X TTIs needs to be transmitted in one random access process, the terminal 201 determines, according to X and information 4, an access signature that is sent by the terminal 201 to the base station 202 in the current random access process, and the terminal 201 sends the determined access signature to the base station 202. The base station 202 determines, according to the received access signature, the quantity X of the TTIs sent by the terminal 201.

If the third indication information includes information 5, in an optional implementation manner, the terminal 201 knows in advance a correspondence between a quantity of TTIs that the terminal is allowed to send and a physical resource that is used by the terminal to send an access preamble, and after receiving information 5, the terminal 201 may know, according to the correspondence known in advance, a quantity of the TTIs that may be sent by the terminal 201 in the current random access process. If it is determined that the multiple TTIs may be sent, the radio network controller 203 successfully notifies the terminal 201 that the terminal 201 can send the data of the multiple TTIs in one random access process. The terminal 201 may learn the correspondence in advance by using control information sent by the radio network controller 203 in advance.

In this embodiment, that the terminal 201 sends the access signature to the base station 202 includes: repeating, by the terminal, the access signature 256 times to form an access preamble and sending the access preamble to the base station.

Optionally, after receiving the third indication information in step S301, the terminal 201 performs step S302. When the terminal 201 determines that the radio network controller 203 allows the terminal 201 to send data of multiple TTIs in one random access process, the terminal 201 further determines whether the following conditions are met, and determines, when one or more of the following conditions are met, to transmit the data of the multiple TTIs to the base station in the current random access process:

condition 1: an amount of data buffered in the terminal is greater than or equal to the data volume threshold;

condition 2: a path loss from the terminal to the base station is less than or equal to a preset path loss threshold; or condition 3: load of a cell in which the terminal is located is less than or equal to a preset cell load threshold.

For example, in a possible implementation manner, when condition 1 is met, the terminal 201 determines to transmit the data of the multiple TTIs to the base station in the current random access process.

For another example, in another possible implementation manner, when both condition 1 and condition 2 are met, the terminal 201 determines to transmit the data of the multiple TTIs to the base station 202 in the current random access process.

The foregoing two possible implementation manners are only examples. In specific implementation, after receiving the third indication information, the terminal 201 determines, according to a data buffer status of the terminal 201 and/or information about a wireless environment or the like, whether to transmit the data of the multiple TTIs to the base station 202 in the current random access process.

Optionally, in the procedure shown in FIG. 3, in step S303, in addition to indicating to the base station 202 that the terminal 201 transmits the data of the multiple TTIs in the current random access process, the first indication information that is sent by the terminal 201 to the base station 202 is further used to indicate to the base station 202 that: the multiple TTIs are specifically X TTIs, and X is a positive integer; or after transmitting a current TTI, the terminal 201 further needs to transmit data corresponding to another TTI in the current random access process; or a current TTI is the last TTI that is transmitted by the terminal 201 in the current random access process.

The following four manners may be used by the terminal 201 to indicate related information, for example, the data of the multiple TTIs is transmitted in the current random access process, to the base station:

[Manner 1]

The terminal 201 sends the first indication information to the base station 202 when the terminal 201 sends an access preamble, to indicate that the terminal 201 needs to transmit the data of the multiple TTIs in the current random access process.

Herein, for manner 1, in a possible implementation manner, in step S301 shown in FIG. 3, the radio network controller 203 sends information 2 or information 4 to the terminal 201 when sending the third indication information.

Herein, using that a physical resource that is used by the terminal to send an access preamble is an access signature as an example, the radio network controller 203 sends an access signature group: group 1, group 2, ..., group P to the terminal 201, where P is a positive integer. An access signature in group 1 corresponds to that the terminal sends data of two TTIs in one random access process, an access signature in group 2 corresponds to that the terminal sends three TTIs in one random access process, and by analog, an access signature in group P corresponds to that the terminal sends P+1 TTIs in one random access process.

After receiving the access signature group, the terminal 201 determines, according to an amount of data buffered in the terminal 201 and a size of a data packet that can be sent in one TTI, that Q TTIs are needed to send the data, where Q is a positive integer, and Q is not greater than P. The terminal selects an access signature in group Q−1, and generates a preamble according to the selected access signature to perform random access.

After detecting the access signature sent by the terminal 201, the base station 202 determines, according to the correspondence, a quantity of TTIs that need to be sent by the terminal 201, and ensures that a data transmission code channel that is used by the terminal 201 to send the multiple TTIs is not allocated to another terminal in this period of time.

[Manner 2]

The terminal 201 sends the first indication information by using a dedicated physical control channel (DPCCH).

[Manner 3]

When the terminal 201 sends an access preamble, the terminal 201 sends the first indication information to the base station 202, to indicate that the terminal 201 needs to transmit the data of the multiple TTIs in the current random access process; and sends second indication information by using a DPCCH, where the second indication information is used to indicate that: the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

In manner 3, the terminal 201 may indicate, to the base station by using the first indication information, that the terminal 201 needs to transmit the multiple TTIs, or indicate a TTI quantity of the multiple TTIs that need to be transmitted by the terminal 201. However, available information bits are limited. Therefore, ever if the TTI quantity of the multiple TTIs that need to be transmitted is indicated, only several fixed values may be selected, and precise indication cannot be achieved. When the second indication information is sent, the quantity of the TTIs transmitted to the base station 202 can be precisely indicated to the base station 202 in a process in which the terminal 201 transmits the data of the multiple TTIs to the base station, and relatively few information bits are occupied. In this way, it can be ensured that the base station 202 releases, as quickly as possible, a resource that is used by the terminal 201 to transmit the data, thereby improving resource utilization.

[Manner 4]

The first indication information includes first sub information and second sub information, and in this case, the first indication information is further used to indicate that: the multiple TTIs are specifically X TTIs.

The first sub information is used to indicate multiple data packets that are transmitted by the terminal 201 to the base station 202 in the current random access process, and optionally, may further specifically indicate a quantity M of the transmitted data packets.

The second sub information is used to indicate a quantity N of times of repeatedly transmitting each data packet that is sent by the terminal 201 in the current random access process, where M*N=X, and M and N are positive integers.

Optionally, the second sub information is further used to indicate whether retransmission of a current data packet that is sent by the terminal 201 in the current random access process ends.

The terminal 201 may send the first sub information and the second sub information by using a DPCCH.

For example, as shown in FIG. 5A to FIG. 5E, the terminal 201 sends the first sub information by using a first information field, and sends the second sub information by using a second information field.

Figure 5A:
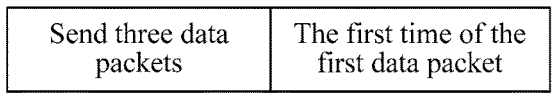
FIG. 5A to FIG. 5E are schematic diagrams of a method for sending, by a terminal, first sub information and second sub information by using a DPCCH.

In FIG. 5A, the terminal 201 indicates, to the base station 202 by using the first information field, that the terminal 201 needs to send three data packets, and indicates, to the base station 202 by using the second information field, that the first data packet is currently transmitted for the first time.

Figure 5B:
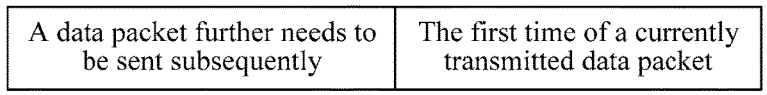

In FIG. 5B, the terminal 201 indicates, to the base station 202 by using the first information field, that a data packet further needs to be sent subsequently, and indicates, to the base station 202 by using the second information field, that a currently transmitted data packet is currently transmitted for the first time.

Figure 5C:
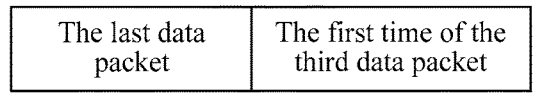

In FIG. 5C, the terminal 201 indicates, to the base station 202 by using the first information field, that the last data packet is currently transmitted by the terminal 201, and indicates, to the base station 202 by using the second information field, that the third data packet is currently transmitted for the first time.

Figure 5D:
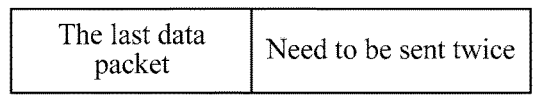

In FIG. 5D, the terminal 201 indicates, to the base station 202 by using the first information field, that the terminal 201 currently transmits the last data packet, and indicates, to the base station 202 by using the second information field, that the data packet needs to be repeatedly transmitted twice.

Figure 5E:
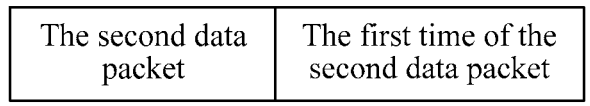

In FIG. 5E, the terminal 201 indicates, to the base station 202 by using the first information field, that the terminal 201 needs to send the second data packet, and indicates, to the base station 202 by using the second information field, that the second data packet is currently transmitted for the first time.

The terminal 201 sends the first sub information when the terminal 201 sends an access preamble to the base station 202, and sends the second sub information to the base station 202 when the terminal 201 transmits the data of the multiple TTIs; or the terminal 201 sends the second sub information when the terminal 201 sends an access preamble to the base station 202, and sends the first sub information to the base station 202 when the terminal 201 transmits the data of the multiple TTIs.

Optionally, in manner 4, if the terminal 201 sends the first sub information when the terminal 201 sends the access preamble to the base station 202, the first sub information further includes: information about a physical resource that is used by the terminal 201 to send the access preamble; or if the terminal 201 sends the second sub information when the terminal sends the access preamble to the base station 202, the second sub information further includes: information about a physical resource that is used by the terminal 201 to send the access preamble.

Optionally, if the terminal 201 sends the second sub information when the terminal 201 transmits the data of the multiple TTIs to the base station 202, the second sub information is sent by using a DPCCH; or if the terminal 201 sends the first sub information when the terminal 201 transmits the data of the multiple TTIs to the base station 202, the first sub information is sent by using a DPCCH.

Optional implementation manners are not limited to the foregoing four manners, as long as it can be indicated to the base station 202 that the terminal 201 transmits the data of the multiple TTIs in one random access process.

The following describes, by using a WCDMA standard as an example, a method for sending, by the terminal 201, indication information by using the DPCCH in the foregoing manner 2, manner 3, and manner 4.

Figure 4:
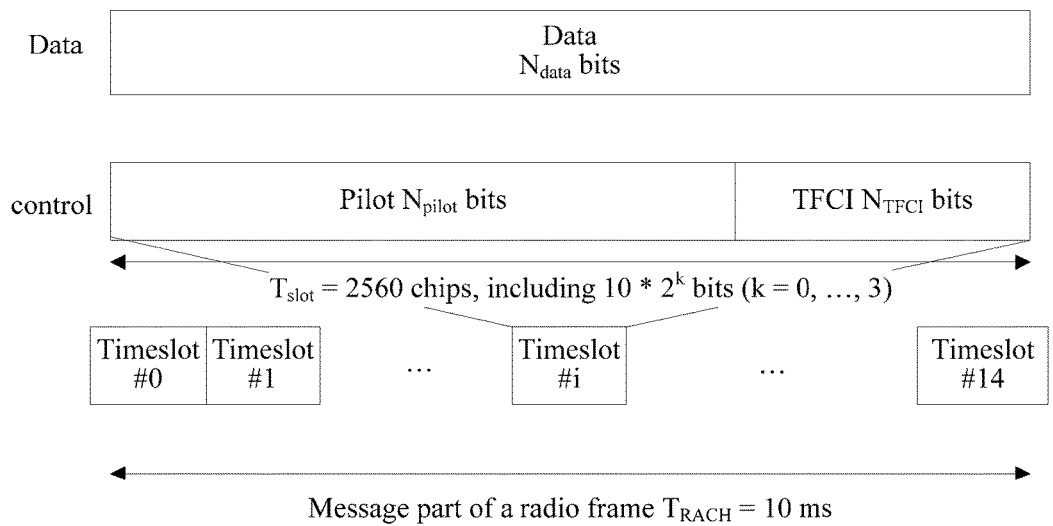
FIG. 4 is a schematic diagram of a frame structure of a radio frame sent by a terminal in a random access process.

As shown in FIG. 4, in a random access process in an existing WCDMA system, a length of a message part of a radio frame sent by the terminal is TRACH=10 ms, including a timeslot #0, a timeslot #1, . . . , a timeslot #i, . . . , and a timeslot #14. For each timeslot, the terminal simultaneously sends a data part and a control part. The data part includes Ndata bits, and the control part includes a pilot of the Npilot bits and a transmit format combined indicator (TFCI) of N TFCI bits.

In this embodiment of the present invention, in an optional implementation manner, the terminal 201 transmits the data of the multiple TTIs by using the data part in FIG. 4, and transmits the indication information by using several bits in the pilot and/or the TFCI that are sent at the same time when the data part is sent. Because the pilot and the TFCI are repeatedly sent multiple times, several times of sending by occupying the pilot and/or the TFCI does not cause a pilot and TFCI sending failure, and only has some effect on performance of receiving the pilot and the TFCI.

In FIG. 4, the control part is transmitted by using the DPCCH. Therefore, in this embodiment of the present invention, the indication information may be transmitted by using the DPCCH.

Alternatively, the terminal 201 may further send the first indication information by using the DPCCH in the following manners:

Two bits in a transmission pilot sequence are used to transmit the indication information. In this case, the DPCCH may include a 6-bit pilot sequence, a 2-bit transmit format combined indicator, and 2-bit first indication information. Because two bits may indicate transmission of data of four TTIs at most, two bits in a control part in each of 15 timeslots of a PRACH may be selected to carry the first indication information, and then the two bits in each of the 15 timeslots are used together to carry the first indication information, so as to indicate transmission of data of more TTIs.

For manner 1 and manner 3, the terminal 201 sends the first indication information when the terminal 201 sends the access preamble to the base station 202, and the first indication information further includes: information about a physical resource that is used by the terminal to send the access preamble, to instruct the base station 202 to determine, according to a first correspondence, that the terminal 201 transmits data of the X TTIs in the current random access process.

The first correspondence includes: a correspondence between the information about the physical resource that is used by the terminal to send the access preamble and X.

Optionally, information about the first correspondence is sent by the radio network controller 203 to the terminal 201 before the terminal 201 sends the first indication information to the base station 202.

Optionally, the radio network controller 203 further sends the information about the first correspondence to the base station 202. The base station 202 stores the information, and when the terminal 201 sends an access preamble, the base station 202 determines, according to the prestored first correspondence, a quantity of TTIs that are transmitted by the terminal 201 in one random access process.

Similarly, for manner 4, if the terminal 201 sends the first sub information when the terminal 201 sends the access preamble to the base station 202, the first sub information is further used to instruct the base station 202 to determine, according to a second correspondence, that the terminal 201 transmits M data packets to the base station 202 in the current random access process, and the second correspondence includes: a correspondence between information about a physical resource that is used by the terminal to send an access preamble and a quantity of data packets that are transmitted by the terminal to the base station in one random access process.

Optionally, information about the second correspondence is sent by the radio network controller 203 to the terminal 201 before the terminal 201 sends the first indication information to the base station 202.

Optionally, the radio network controller 203 further sends the information about the second correspondence to the base station 202. The base station 202 stores the information, and when the terminal 201 sends an access preamble, the base station 202 determines, according to the prestored second correspondence, a quantity of data packets that are transmitted by the terminal 201 in one random access process.

If the terminal 201 sends the second sub information when the terminal 201 sends the access preamble to the base station 202, the second sub information is further used to instruct the base station 202 to determine, according to a third correspondence, that each data packet that is transmitted by the terminal 201 to the base station 202 is repeatedly transmitted for N times in the current random access process, where the third correspondence includes: a correspondence between information about a physical resource that is used by the terminal to send an access preamble and a quantity of times of repeatedly transmitting, by the terminal in one random access process, each data packet that is transmitted by the terminal to the base station.

Optionally, information about the third correspondence is sent by the radio network controller 203 to the terminal 201 before the terminal 201 sends the first indication information to the base station 202.

Optionally, the radio network controller 203 further sends the information about the third correspondence to the base station 202. The base station 202 stores the information, and when the terminal 201 sends an access preamble, the base station 202 determines, according to the prestored third correspondence, a quantity of times of repeatedly transmitting each data packet that is transmitted by the terminal 201 in one random access process.

The foregoing describes an optional solution of transmitting, by the terminal, the data of the multiple TTIs in the random access process shown in FIG. 3. The following describes another solution. In the solution, the terminal does not need to send indication information to the base station to indicate that the terminal needs to transmit data of multiple TTIs, but the base station determines whether the terminal transmits data of multiple TTIs.

When determining that data of multiple TTIs needs to be sent, the terminal transmits a data packet in an obtained random access resource. As a receive end, after sending an acknowledgement indication (ACK) by using an AICH, the base station detects, in preset duration, whether the terminal continues to send data. If the base station does not detect, in the preset duration, that the terminal sends a data packet in the random access resource used by the terminal, the base station determines that continuous data transmission of the terminal ends, and the random access resource can be allocated to another terminal. Optionally, the preset duration may be one TTI.

The foregoing describes the wireless communications system provided in the embodiments of the present invention. Based on a same invention concept, the embodiments of the present invention further provide a terminal, a base station, a radio network controller, a data transmission method in a random access process, and a method for sending indication information. Because the principle thereof for resolving a technical problem is similar to that of the wireless communications system provided in the embodiments of the present invention, for implementation thereof, refer to implementation of the system, and repeated content is not described again.

Figure 6:
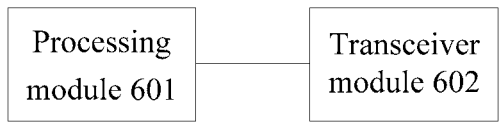
FIG. 6 is a schematic structural diagram of a first terminal according to an embodiment of the present invention.

FIG. 6 is a schematic structural diagram of a first terminal according to an embodiment of the present invention. As shown in FIG. 6, the terminal includes: a processing module 601, configured to determine that the terminal transmits data of multiple transmission time intervals (TTIs) to a base station in a current random access process; and a transceiver module 602, configured to send first indication information to the base station, where the first indication information is used to indicate that the terminal transmits the data of the multiple TTIs in the current random access process.

Optionally, the first indication information is further used to indicate that: the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

Optionally, the first indication information is sent by using a dedicated physical control channel (DPCCH).

Optionally, the transceiver module 602 is further configured to: send second indication information to the base station, where the second indication information is used to indicate that: the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

Optionally, the second indication information is sent by using a dedicated physical control channel (DPCCH).

Optionally, if the first indication information is further used to indicate that the multiple TTIs are specifically X TTIs, the transceiver module 602 is specifically configured to send the first indication information when the terminal sends an access preamble to the base station, where the first indication information further includes: information about a physical resource that is used by the terminal to send the access preamble, to instruct the base station to determine, according to a first correspondence, that the terminal transmits data of the X TTIs in the current random access process; and the first correspondence includes: a correspondence between the information about the physical resource that is used by the terminal to send the access preamble and X.

Optionally, if the first indication information is further used to indicate that the multiple TTIs are specifically X TTIs, the first indication information includes first sub information and second sub information; the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where M*N=X, and M and N are positive integers.

Optionally, the transceiver module 602 is specifically configured to: send the first sub information when the terminal sends an access preamble to the base station, and send the second sub information to the base station when the terminal transmits the data of the multiple TTIs; or send the second sub information when the terminal sends an access preamble to the base station, and send the first sub information to the base station when the terminal transmits the data of the multiple TTIs.

Optionally, if the transceiver module 602 sends the first sub information when the terminal sends the access preamble to the base station, the first sub information further includes: information about a physical resource that is used by the terminal to send the access preamble; or if the transceiver module 602 sends the second sub information when the terminal sends the access preamble to the base station, the second sub information further includes: information about a physical resource that is used by the terminal to send the access preamble.

Optionally, if the transceiver module 602 sends the first sub information when the terminal sends the access preamble to the base station, the first sub information is further used to instruct the base station to determine, according to a second correspondence, that the terminal transmits M data packets to the base station in the current random access process, and the second correspondence includes: a correspondence between information about a physical resource that is used by the terminal to send an access preamble and a quantity of data packets that are transmitted by the terminal to the base station in one random access process.

Optionally, if the transceiver module 602 sends the second sub information when the terminal sends the access preamble to the base station, the second sub information is further used to instruct the base station to determine, according to a third correspondence, that each data packet that is transmitted by the terminal to the base station is repeatedly transmitted for N times in the current random access process, and the third correspondence includes: a correspondence between information about a physical resource that is used by the terminal to send an access preamble and a quantity of times of repeatedly transmitting, by the terminal in one random access process, each data packet that is transmitted by the terminal to the base station.

Optionally, if the transceiver module 602 sends the second sub information when the terminal transmits the data of the multiple TTIs to the base station, the second sub information is sent by using a DPCCH; or if the transceiver module 602 sends the first sub information when the terminal transmits the data of the multiple TTIs to the base station, the first sub information is sent by using a DPCCH.

Optionally, the transceiver module 602 is further configured to: before sending the first indication information to the base station, receive third indication information that is sent by a radio network controller (RNC) configured to control the base station, where the third indication information is used to indicate that the terminal is allowed to transmit data of multiple TTIs in the current random access process.

Optionally, the third indication information may include at least one of the following information: a maximum quantity of TTIs that the terminal is allowed to transmit in one random access process; indication information indicating that the terminal is allowed to transmit data of multiple TTIs in one random access process; a data volume threshold; information about a physical resource that is available when the terminal needs to send data of multiple TTIs in one random access process; or a correspondence between information about a physical resource that is used by the terminal to send an access preamble and a TTI quantity of multiple TTIs that are transmitted by the terminal in one random access process.

Optionally, the processing module 601 is specifically configured to: determine, when one or more of the following conditions are met, to transmit the data of the multiple TTIs to the base station in the current random access process: an amount of data buffered in the terminal is greater than or equal to the data volume threshold; a path loss from the terminal to the base station is less than or equal to a preset path loss threshold; or load of a cell in which the terminal is located is less than or equal to a preset cell load threshold.

Optionally, the information about the physical resource that is used by the terminal to send the access preamble includes at least one of the following three pieces of information: an access signature that is sent by the terminal to the base station; a PRACH code channel that is used by the terminal to send the access preamble to the base station; or an access timeslot that is used by the terminal to send the access preamble to the base station.

Figure 7:
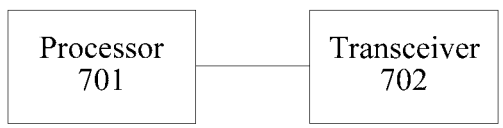
FIG. 7 is a schematic structural diagram of a second terminal according to an embodiment of the present invention.

FIG. 7 is a schematic structural diagram of a second terminal according to an embodiment of the present invention. As shown in FIG. 7, the terminal includes: a processor 701, configured to determine that the terminal transmits data of multiple transmission time intervals (TTIs) to a base station in a current random access process; and a transceiver 702, configured to send first indication information to the base station, where the first indication information is used to indicate that the terminal transmits the data of the multiple TTIs in the current random access process.

For specific implementation of the processor 701, refer to implementation of the processing module 601, and for specific implementation of the transceiver 702, refer to implementation of the transceiver module 602. Repeated content is not described again.

Figure 8:
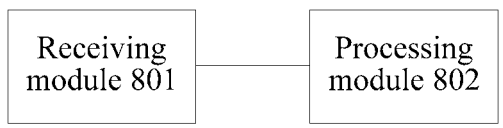
FIG. 8 is a schematic structural diagram of a first base station according to an embodiment of the present invention.

FIG. 8 is a schematic structural diagram of a first base station according to an embodiment of the present invention. As shown in FIG. 8, the base station includes: a receiving module 801, configured to receive first indication information sent by a terminal, where the first indication information is used to indicate to the base station that the terminal transmits data of multiple TTIs in one random access process; and a processing module 802, configured to determine, according to the first indication information, that the terminal transmits data of multiple TTIs in a current random access process.

Optionally, the first indication information is further used to indicate that: the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

Optionally, the first indication information is sent by using a dedicated physical control channel (DPCCH).

Optionally, the receiving module 801 is further configured to: receive second indication information sent by the terminal, where the second indication information is used to indicate that: the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

Optionally, the second indication information is sent by using a dedicated physical control channel (DPCCH).

Optionally, if the first indication information is further used to indicate that the multiple TTIs are specifically X TTIs, the receiving module 801 is specifically configured to receive the first indication information when the base station receives an access preamble sent by the terminal; the first indication information further includes: information about a physical resource that is used by the terminal to send the access preamble, and the processing module 802 is specifically configured to: determine, according to a first correspondence, that the terminal transmits data of the X TTIs in the current random access process, where the first correspondence includes: a correspondence between the information about the physical resource that is used by the terminal to send the access preamble and X.

Optionally, the receiving module 801 is further configured to: before receiving the first indication information sent by the terminal, receive information that is about the first correspondence and that is sent by a radio network controller (RNC) configured to control the base station.

Optionally, if the first indication information is further used to indicate that the multiple TTIs are specifically X TTIs, the first indication information includes first sub information and second sub information; the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where M*N=X, and M and N are positive integers.

Optionally, the receiving module 801 is specifically configured to: receive the first sub information when the base station receives an access preamble sent by the terminal, and receive the second sub information when the base station receives the data of the multiple TTIs that is sent by the terminal; or receive the second sub information when the base station receives an access preamble sent by the terminal, and receive the first sub information when the base station receives the data of the multiple TTIs that is sent by the terminal.

Optionally, if the receiving module 801 receives the first sub information when the base station receives the access preamble sent by the terminal, the first sub information further includes: information about a physical resource that is used by the terminal to send the access preamble; or if the receiving module 801 receives the second sub information when the base station receives the access preamble sent by the terminal, the second sub information further includes: information about a physical resource that is used by the terminal to send the access preamble.

Optionally, if the receiving module 801 receives the first sub information when the base station receives the access preamble sent by the terminal, the processing module 802 is specifically configured to determine, according to a second correspondence, that the terminal transmits M data packets to the base station in the current random access process, where the second correspondence includes: a correspondence between information about a physical resource that is used by the terminal to send an access preamble and a quantity of data packets that are transmitted by the terminal to the base station in one random access process.

Optionally, if the receiving module 801 receives the second sub information when the base station receives the access preamble sent by the terminal, the processing module 802 is specifically configured to determine, according to a third correspondence, that each data packet that is transmitted by the terminal to the base station is repeatedly transmitted for N times in the current random access process, where the third correspondence includes: a correspondence between information about a physical resource that is used by the terminal to send an access preamble and a quantity of times of repeatedly transmitting, by the terminal in one random access process, each data packet that is transmitted by the terminal to the base station.

Optionally, if the receiving module 801 receives the first sub information when the base station receives the access preamble sent by the terminal, the receiving module 801 is further configured to: before receiving the first sub information, receive information that is about the second correspondence and that is sent by an RNC configured to control the base station, and the processing module 802 is further configured to determine the second correspondence according to the information that is about the second correspondence and that is received by the receiving module 801.

Optionally, if the receiving module 801 receives the second sub information when the base station receives the access preamble sent by the terminal, the receiving module 801 is further configured to: before receiving the second sub information, receive information that is about the third correspondence and that is sent by an RNC configured to control the base station, and the processing module 802 is further configured to determine the third correspondence according to the information that is about the third correspondence and that is received by the receiving module 801.

Optionally, if the receiving module 801 receives the second sub information when the base station receives the data of the multiple TTIs that is sent by the terminal, the second sub information is sent by the terminal by using a DPCCH.

Optionally, if the receiving module 801 receives the first sub information when the base station receives the data of the multiple TTIs that is sent by the terminal, the first sub information is sent by the terminal by using a DPCCH.

Optionally, the information about the physical resource that is used by the terminal to send the access preamble includes at least one of the following three pieces of information: an access signature that is sent by the terminal to the base station; a PRACH code channel that is used by the terminal to send the access preamble to the base station; or an access timeslot that is used by the terminal to send the access preamble to the base station.

Optionally, the processing module 802 is further configured to: after determining, according to the first indication information, that the terminal transmits the data of the multiple TTIs in the current random access process, when the terminal transmits the data of the multiple TTIs, skip allocating, to another terminal, a code channel that is used by the terminal to transmit the data of the multiple TTIs.

Figure 9:
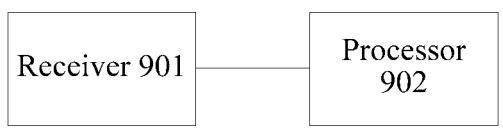
FIG. 9 is a schematic structural diagram of a second base station according to an embodiment of the present invention.

FIG. 9 is a schematic structural diagram of a second base station according to an embodiment of the present invention. As shown in FIG. 9, the base station includes: a receiver 901, configured to receive first indication information sent by a terminal, where the first indication information is used to indicate to the base station that the terminal transmits data of multiple TTIs in one random access process; and a processor 902, configured to determine, according to the first indication information, that the terminal transmits the data of the multiple TTIs in a current random access process.

For specific implementation of the receiver 901, refer to implementation of the receiving module 801, and for specific implementation of the processor 902, refer to implementation of the processing module 802. Repeated content is not described again.

Figure 10:
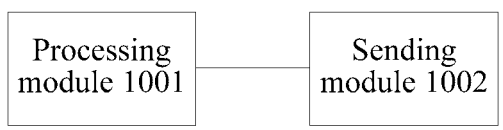
FIG. 10 is a schematic structural diagram of a first radio network controller according to an embodiment of the present invention.

FIG. 10 is a schematic structural diagram of a first radio network controller according to an embodiment of the present invention. As shown in FIG. 10, the radio network controller includes: a processing module 1001, configured to determine to allow a terminal to transmit data of multiple TTIs in one random access process; and a sending module 1002, configured to send third indication information to the terminal, where the third indication information is used to indicate that the terminal is allowed to transmit data of multiple TTIs in a current random access process.

Optionally, the third indication information may include at least one of the following information: a maximum quantity of TTIs that the terminal is allowed to transmit in one random access process; indication information indicating that the terminal is allowed to transmit data of multiple TTIs in one random access process; a data volume threshold; a correspondence between information about a physical resource that is used by the terminal to send an access preamble and a TTI quantity of multiple TTIs that are transmitted by the terminal in one random access process; or information about a physical resource that is available when the terminal needs to send data of multiple TTIs in one random access process.

Figure 11:
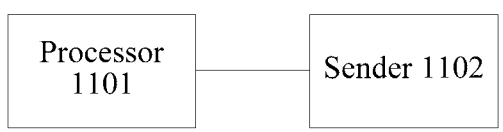
FIG. 11 is a schematic structural diagram of a second radio network controller according to an embodiment of the present invention.

FIG. 11 is a schematic structural diagram of a second radio network controller according to an embodiment of the present invention. As shown in FIG. 11, the radio network controller includes: a processor 1101, configured to determine to allow a terminal to transmit data of multiple TTIs in one random access process; and a sender 1102, configured to send third indication information to the terminal, where the third indication information is used to indicate that the terminal is allowed to transmit data of multiple TTIs in a current random access process.

Optionally, the third indication information may include at least one of the following information: a maximum quantity of TTIs that the terminal is allowed to transmit in one random access process; indication information indicating that the terminal is allowed to transmit data of multiple TTIs in one random access process; a data volume threshold; a correspondence between information about a physical resource that is used by the terminal to send an access preamble and a TTI quantity of multiple TTIs that are transmitted by the terminal in one random access process; or information about a physical resource that is available when the terminal needs to send data of multiple TTIs in one random access process.

Figure 12:
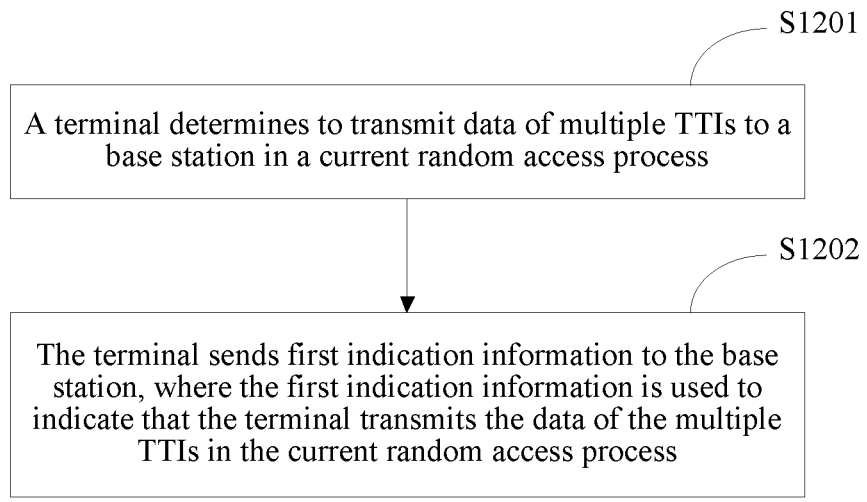
FIG. 12 is a flowchart of a first data transmission method in a random access process according to an embodiment of the present invention.

FIG. 12 is a flowchart of a first data transmission method in a random access process according to an embodiment of the present invention. As shown in FIG. 12, the method includes the following steps.

S1201: A terminal determines to transmit data of multiple transmission time intervals (TTIs) to a base station in a current random access process.

S1202: The terminal sends first indication information to the base station, where the first indication information is used to indicate that the terminal transmits the data of the multiple TTIs in the current random access process.

Optionally, the first indication information is further used to indicate that: the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

Optionally, the first indication information is sent by using a dedicated physical control channel (DPCCH).

Optionally, the method further includes: sending, by the terminal, second indication information to the base station, where the second indication information is used to indicate that: the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

Optionally, the second indication information is sent by using a dedicated physical control channel (DPCCH).

Optionally, if the first indication information is further used to indicate that the multiple TTIs are specifically X TTIs, the sending, by the terminal, first indication information to the base station includes: sending, by the terminal, the first indication information when the terminal sends an access preamble to the base station, where the first indication information further includes: information about a physical resource that is used by the terminal to send the access preamble, to instruct the base station to determine, according to a first correspondence, that the terminal transmits data of the X TTIs in the current random access process; and the first correspondence includes: a correspondence between the information about the physical resource that is used by the terminal to send the access preamble and X.

Optionally, if the first indication information is further used to indicate that the multiple TTIs are specifically X TTIs, the first indication information includes first sub information and second sub information; the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where M*N=X, and M and N are positive integers.

Optionally, the sending, by the terminal, first indication information to the base station in step S1202 includes: sending, by the terminal, the first sub information when the terminal sends an access preamble to the base station, and sending the second sub information to the base station when the terminal transmits the data of the multiple TTIs; or sending, by the terminal, the second sub information when the terminal sends an access preamble to the base station, and sending the first sub information to the base station when the terminal transmits the data of the multiple TTIs.

Optionally, if the terminal sends the first sub information when the terminal sends the access preamble to the base station, the first sub information further includes: information about a physical resource that is used by the terminal to send the access preamble; or if the terminal sends the second sub information when the terminal sends the access preamble to the base station, the second sub information further includes: information about a physical resource that is used by the terminal to send the access preamble.

Optionally, if the terminal sends the first sub information when the terminal sends the access preamble to the base station, the first sub information is further used to instruct the base station to determine, according to a second correspondence, that the terminal transmits M data packets to the base station in the current random access process, and the second correspondence includes: a correspondence between information about a physical resource that is used by the terminal to send an access preamble and a quantity of data packets that are transmitted by the terminal to the base station in one random access process.

Optionally, if the terminal sends the second sub information when the terminal sends the access preamble to the base station, the second sub information is further used to instruct the base station to determine, according to a third correspondence, that each data packet that is transmitted by the terminal to the base station is repeatedly transmitted for N times in the current random access process, and the third correspondence includes: a correspondence between information about a physical resource that is used by the terminal to send an access preamble and a quantity of times of repeatedly transmitting, by the terminal in one random access process, each data packet that is transmitted by the terminal to the base station.

Optionally, if the terminal sends the second sub information when the terminal transmits the data of the multiple TTIs to the base station, the second sub information is sent by using a DPCCH; or if the terminal sends the first sub information when the terminal transmits the data of the multiple TTIs to the base station, the first sub information is sent by using a DPCCH.

Optionally, before the sending, by the terminal, first indication information to the base station, the method further includes: receiving, by the terminal, third indication information that is sent by a radio network controller (RNC) configured to control the base station, where the third indication information is used to indicate that the terminal is allowed to transmit data of multiple TTIs in the current random access process.

Optionally, the third indication information may include at least one of the following information: a maximum quantity of TTIs that the terminal is allowed to transmit in one random access process; indication information indicating that the terminal is allowed to transmit data of multiple TTIs in one random access process; a data volume threshold; information about a physical resource that is available when the terminal needs to send data of multiple TTIs in one random access process; or a correspondence between information about a physical resource that is used by the terminal to send an access preamble and a TTI quantity of multiple TTIs that are transmitted by the terminal in one random access process.

Optionally, the determining, by a terminal, to transmit data of multiple TTIs to a base station in a current random access process specifically includes: after receiving the third indication information, determining, by the terminal when one or more of the following conditions are met, to transmit the data of the multiple TTIs to the base station in the current random access process: an amount of data buffered in the terminal is greater than or equal to the data volume threshold; a path loss from the terminal to the base station is less than or equal to a preset path loss threshold; or load of a cell in which the terminal is located is less than or equal to a preset cell load threshold.

Optionally, the information about the physical resource that is used by the terminal to send the access preamble includes at least one of the following three pieces of information: an access signature that is sent by the terminal to the base station; a PRACH code channel that is used by the terminal to send the access preamble to the base station; or an access timeslot that is used by the terminal to send the access preamble to the base station.

Figure 13:
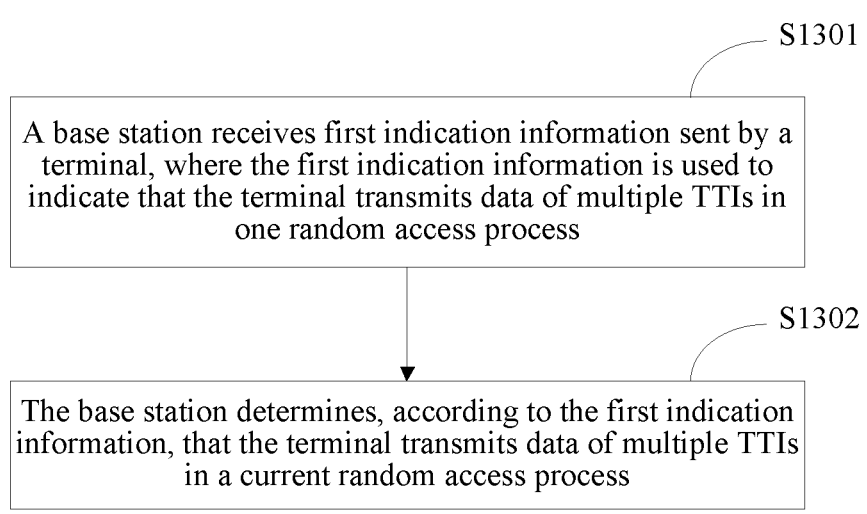
FIG. 13 is a flowchart of a second data transmission method in a random access process according to an embodiment of the present invention.

FIG. 13 is a flowchart of a second data transmission method in a random access process according to an embodiment of the present invention. As shown in FIG. 13, the method includes the following steps.

S1301: A base station receives first indication information sent by a terminal, where the first indication information is used to indicate that the terminal transmits data of multiple TTIs in one random access process.

S1302: The base station determines, according to the first indication information, that the terminal transmits data of multiple TTIs in a current random access process.

Optionally, the first indication information is further used to indicate that: the multiple TTIs are specifically X TTIs, and X is a positive integer; or after transmitting a current TTI, the terminal further needs to transmit data corresponding to another TTI in the current random access process; or a current TTI is the last TTI that is transmitted by the terminal in the current random access process.

Optionally, the first indication information is sent by using a dedicated physical control channel (DPCCH).

Optionally, the method further includes: receiving, by the base station, second indication information sent by the terminal, where the second indication information is used to indicate that: the multiple TTIs are specifically X TTIs, and X is a positive integer; or after transmitting a current TTI, the terminal further needs to transmit data corresponding to another TTI in the current random access process; or a current TTI is the last TTI in the data transmitted by the terminal in the current random access process.

Optionally, the second indication information is sent by using a dedicated physical control channel (DPCCH).

Optionally, if the first indication information is further used to indicate that the multiple TTIs are specifically X TTIs, the receiving, by a base station, first indication information includes: receiving, by the base station, the first indication information when the base station receives an access preamble sent by the terminal; the first indication information further includes: information about a physical resource that is used by the terminal to send the access preamble, and the determining, by the base station according to the first indication information, that the terminal continuously transmits data of multiple TTIs in a current random access process includes: determining, by the base station according to a first correspondence, that the terminal transmits data of the X TTIs in the current random access process, where the first correspondence includes: a correspondence between the information about the physical resource that is used by the terminal to send the access preamble and X.

Optionally, before the receiving, by a base station, first indication information sent by a terminal, the method further includes: receiving, by the base station, information that is about the first correspondence and that is sent by a radio network controller (RNC) configured to control the base station.

Optionally, if the first indication information is further used to indicate that the multiple TTIs are specifically X TTIs, the first indication information includes first sub information and second sub information; the first sub information is used to indicate a quantity M of data packets that are transmitted by the terminal to the base station in the current random access process; and the second sub information is used to indicate a quantity N of times of repeatedly transmitting each data packet that is sent by the terminal in the current random access process, where M*N=X, and M and N are positive integers.

Optionally, the receiving, by a base station, first indication information includes: receiving, by the base station, the first sub information when the base station receives an access preamble sent by the terminal, and receiving the second sub information when the base station receives the data of the multiple TTIs that is sent by the terminal; or receiving, by the base station, the second sub information when the base station receives an access preamble sent by the terminal, and receiving the first sub information when the base station receives the data of the multiple TTIs that is sent by the terminal.

Optionally, if the base station receives the first sub information when the base station receives the access preamble sent by the terminal, the first sub information further includes: information about a physical resource that is used by the terminal to send the access preamble; or if the base station receives the second sub information when the base station receives the access preamble sent by the terminal, the second sub information further includes: information about a physical resource that is used by the terminal to send the access preamble.

Optionally, if the base station receives the first sub information when the base station receives the access preamble sent by the terminal, the determining, by the base station according to the first indication information, that the terminal transmits data of multiple TTIs in a current random access process includes: determining, by the base station according to a second correspondence, that the terminal transmits M data packets to the base station in the current random access process, where the second correspondence includes: a correspondence between information about a physical resource that is used by the terminal to send an access preamble and a quantity of data packets that are transmitted by the terminal to the base station in one random access process.

Optionally, if the base station receives the second sub information when the base station receives the access preamble sent by the terminal, the determining, by the base station according to the first indication information, that the terminal transmits data of multiple TTIs in a current random access process includes: determining, by the base station according to a third correspondence, that each data packet that is transmitted by the terminal to the base station is repeatedly transmitted for N times in the current random access process, where the third correspondence includes: a correspondence between information about a physical resource that is used by the terminal to send an access preamble and a quantity of times of repeatedly transmitting, by the terminal in one random access process, each data packet that is transmitted by the terminal to the base station.

Optionally, if the base station receives the first sub information when the base station receives the access preamble sent by the terminal, before the receiving, by the base station, the first sub information, the method further includes: receiving, by the base station, information that is about the second correspondence and that is sent by an RNC configured to control the base station, and determining, by the base station, the second correspondence according to the received information about the second correspondence.

Optionally, if the base station receives the second sub information when the base station receives the access preamble sent by the terminal, before the receiving, by the base station, the second sub information, the method further includes: receiving, by the base station, information that is about the third correspondence and that is sent by an RNC configured to control the base station, and determining, by the base station, the third correspondence according to the received information about the third correspondence.

Optionally, if the base station receives the second sub information when the base station receives the data of the multiple TTIs that is sent by the terminal, the second sub information is sent by the terminal by using a DPCCH.

Optionally, if the base station receives the first sub information when the base station receives the data of the multiple TTIs that is sent by the terminal, the first sub information is sent by the terminal by using a DPCCH.

Optionally, the information about the physical resource that is used by the terminal to send the access preamble includes at least one of the following three pieces of information: an access signature that is sent by the terminal to the base station; a PRACH code channel that is used by the terminal to send the access preamble to the base station; or an access timeslot that is used by the terminal to send the access preamble to the base station.

Optionally, after the determining, by the base station according to the first indication information, that the terminal transmits data of multiple TTIs in a current random access process, the method further includes: when the terminal transmits the data of the multiple TTIs, skipping allocating, by the base station to another terminal, a code channel that is used by the terminal to transmit the data of the multiple TTIs.

Figure 14:
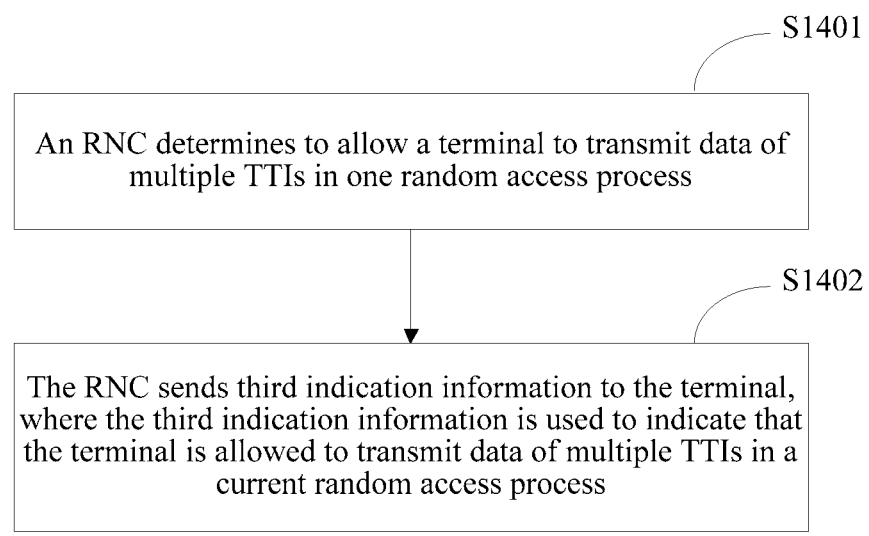
FIG. 14 is a flowchart of a method for sending indication information according to an embodiment of the present invention.

FIG. 14 is a flowchart of a method for sending indication information according to an embodiment of the present invention. As shown in FIG. 14, the method includes the following steps.

S1401: A radio network controller (RNC) determines to allow a terminal to transmit data of multiple TTIs in one random access process.

S1402: The RNC sends third indication information to the terminal, where the third indication information is used to indicate that the terminal is allowed to transmit data of multiple TTIs in a current random access process.

Optionally, the third indication information may include at least one of the following information: a maximum quantity of TTIs that the terminal is allowed to transmit in one random access process; indication information indicating that the terminal is allowed to transmit data of multiple TTIs in one random access process; a data volume threshold; a correspondence between information about a physical resource that is used by the terminal to send an access preamble and a TTI quantity of multiple TTIs that are transmitted by the terminal in one random access process; or information about a physical resource that is available when the terminal needs to send data of multiple TTIs in one random access process.

In conclusion, in this embodiment of the present invention, a terminal sends first indication information to a base station, to indicate that the terminal transmits data of multiple TTIs in a current random access process, and the base station determines, according to the received first indication information, that the terminal transmits the data of the multiple TTIs in the current random access process. In this way, the terminal can transmit data of multiple TTIs in one random access process.

Further, when the terminal transmits the data of the multiple TTIs, the base station may not allocate, to another terminal, a code channel that is used by the terminal to transmit the data of the multiple TTIs, so as to ensure data transmission of the terminal.

Further, before sending the first indication information to the base station, the terminal may receive third indication information sent by a radio network controller (RNC). The third indication information is used to indicate that the terminal is allowed to transmit data of multiple TTIs in the current random access process. After the terminal receives the third indication information, when determining that the data of the multiple TTIs needs to be transmitted to the base station in the current random access process, the terminal sends the first indication information to the base station.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from scope of the present invention. The present invention is intended to cover these modifications and variations provided that they fall within the scope of protection defined by the following claims and their equivalent technologies. Additionally, statements made herein characterizing the invention refer to an embodiment of the invention and not necessarily all embodiments.

What is claimed is:

1. A terminal, comprising:
    a processor, configured to determine that data of multiple transmission time intervals (TTIs) is to be transmitted to a base station in a current random access process; and
    a transmitter, configured to send first indication information to the base station, wherein the first indication information indicates that data of multiple TTIs is to be transmitted from the terminal to the base station in the current random access process; wherein the first indication information further indicates: the number of TTIs in which data is to be transmitted from the terminal to the base station; or
    the terminal needs to transmit data of another TTI in the current random access process after transmitting data of a current TTI; or
    data of a current TTI is the last data to be transmitted by the terminal in the current random access process.

2. The terminal according to claim 1, wherein the first indication information further indicates the number of TTIs in which data is to be transmitted from the terminal to the base station, and wherein the first indication information comprises first sub information and second sub information;
    wherein the first sub information indicates a quantity M of data packets to be transmitted by the terminal to the base station in the current random access process;
    wherein the second sub information indicates a quantity N of times of repeatedly transmitting each data packet to be transmitted by the terminal to the base station in the current random access process; and
    wherein M*N is equal to the number of TTIs in which data is to be transmitted from the terminal to the base station.

3. The terminal according to claim 1, wherein the terminal further comprises:
    a receiver, configured to receive third indication information from a radio network controller (RNC), wherein the third indication information indicates that the terminal is allowed to transmit data of multiple TTIs to the base station in the current random access process.

4. The terminal according to claim 3, wherein the third indication information comprises:
    a maximum quantity of TTIs in which the terminal is allowed to transmit data to the base station in one random access process;
    indication information indicating that the terminal is allowed to transmit data of multiple TTIs to the base station in one random access process;
    a data volume threshold;
    information about a physical resource that is available when the terminal needs to send data of multiple TTIs to the base station in one random access process; and/or
    a correspondence between information about a physical resource to be used by the terminal to send an access preamble and a quantity of TTIs in which data is to be transmitted by the terminal to the base station in one random access process.

5. The terminal according to claim 4, wherein the determination to transmit data of multiple TTIs to the base station in the current random access process is based on one or more of the following conditions being met:
    an amount of data buffered in the terminal being greater than or equal to the data volume threshold;
    a path loss from the terminal to the base station being less than or equal to a preset path loss threshold;

load of a cell in which the terminal is located being less than or equal to a preset cell load threshold.

6. A base station, comprising:
a receiver, configured to receive first indication information from a terminal, wherein the first indication information indicates to the base station that data of multiple transmission time intervals (TTIs) is to be transmitted from the terminal to the base station in one random access process; and
a processor, configured to determine, according to the first indication information, that data of multiple transmission time intervals (TTIs) is to be transmitted from the terminal to the base station in a current random access process; wherein the first indication information further indicates:
the number of TTIs in which data is to be transmitted from the terminal to the base station; or
the terminal needs to transmit data of another TTI in the current random access process after transmitting data of a current TTI; or
data of a current TTI is the last data to be transmitted by the terminal in the current random access process.

7. The base station according to claim 6, wherein the first indication information further indicates the number of TTIs in which data is to be transmitted from the terminal to the base station, and wherein the first indication information comprises first sub information and second sub information;
wherein the first sub information indicates a quantity M of data packets to be transmitted by the terminal to the base station in the current random access process;
wherein the second sub information indicates a quantity N of times of repeatedly transmitting each data packet to be transmitted by the terminal to the base station in the current random access process; and
wherein M*N is equal to the number of TTIs in which data is to be transmitted from the terminal to the base station.

8. A radio network controller (RNC), comprising:
a processor, configured to determine to allow a terminal to transmit data of multiple transmission time intervals (TTIs) to a base station in one random access process; and
a transmitter, configured to send third indication information to the terminal, wherein the third indication information indicates that the terminal is allowed to transmit data of multiple TTIs to the base station in a current random access process; wherein the third indication information comprises:
a maximum quantity of TTIs in which the terminal is allowed to transmit data to the base station in one random access process;
indication information indicating that the terminal is allowed to transmit data of multiple TTIs to the base station in one random access process;
a data volume threshold;
a correspondence between information about a physical resource to be used by the terminal to send an access preamble and a quantity of TTIs in which data is to be transmitted by the terminal to the base station in one random access process; and/or
information about a physical resource that is available when the terminal needs to send data of multiple TTIs to the base station in one random access process.

9. A data transmission method in a random access process, comprising:

determining, by a terminal, to transmit data of multiple transmission time intervals (TTIs) to a base station in a current random access process; and
sending, by the terminal, first indication information to the base station, wherein the first indication information indicates that data of multiple TTIs is to be transmitted from the terminal to the base station in the current random access process; wherein the first indication information further indicates: the number of TTIs in which data is to be transmitted from the terminal to the base station; or
the terminal needs to transmit data of another TTI in the current random access process after transmitting data of a current TTI; or
data of a current TTI is the last data to be transmitted by the terminal in the current random access process.

10. The method according to claim 9, wherein the first indication information further indicates the number of TTIs in which data is to be transmitted from the terminal to the base station, and wherein the first indication information comprises first sub information and second sub information;
wherein the first sub information indicates a quantity M of data packets to be transmitted by the terminal to the base station in the current random access process;
wherein the second sub information indicates a quantity N of times of repeatedly transmitting each data packet to be transmitted by the terminal to the base station in the current random access process; and
wherein M*N is equal to the number of TTIs in which data is to be transmitted from the terminal to the base station.

11. The method according to claim 9, wherein before sending the first indication information to the base station, the method further comprises:
receiving, by the terminal, third indication information from a radio network controller (RNC), wherein the third indication information indicates that the terminal is allowed to transmit data of multiple TTIs to the base station in the current random access process.

12. The method according to claim 11, wherein the third indication information comprises:
a maximum quantity of TTIs in which the terminal is allowed to transmit data to the base station in one random access process;
indication information indicating that the terminal is allowed to transmit data of multiple TTIs to the base station in one random access process;
a data volume threshold;
information about a physical resource that is available when the terminal needs to send data of multiple TTIs to the base station in one random access process; and/or
a correspondence between information about a physical resource to be used by the terminal to send an access preamble and a quantity of TTIs in which data is to be transmitted by the terminal to the base station in one random access process.

13. The method according to claim 12, wherein determining to transmit data of multiple TTIs to the base station in the current random access process is based on one or more of the following conditions being met:
an amount of data buffered in the terminal being greater than or equal to the data volume threshold;
a path loss from the terminal to the base station being less than or equal to a preset path loss threshold;
load of a cell in which the terminal is located being less than or equal to a preset cell load threshold.

14. A data transmission method, comprising:
receiving, by a base station, first indication information from a terminal, wherein the first indication information indicates that data of multiple transmission time intervals (TTIs) is to be transmitted from the terminal to the base station in one random access process; and
determining, by the base station according to the first indication information, that data of multiple TTIs is to be transmitted from the terminal to the base station in a current random access process; wherein the first indication information further indicates: the number of TTIs in which data is to be transmitted from the terminal to the base station; or
the terminal needs to transmit data of another TTI in the current random access process after transmitting data of a current TTI; or
data of a current TTI is the last data to be transmitted by the terminal in the current random access process.

15. The method according to claim 14, wherein the first indication information further indicates the number of TTIs in which data is to be transmitted from the terminal to the base station, and wherein the first indication information comprises first sub information and second sub information;

wherein the first sub information indicates a quantity M of data packets to be transmitted by the terminal to the base station in the current random access process;

wherein the second sub information indicates a quantity N of times of repeatedly transmitting each data packet to be transmitted by the terminal to the base station in the current random access process; and wherein M*N is equal to the number of TTIs in which data is to be transmitted from the terminal to the base station.

* * * * *

UNITED STATES PATENT AND TRADEMARK OFFICE
CERTIFICATE OF CORRECTION

PATENT NO. : 10,314,013 B2
APPLICATION NO. : 15/650625
DATED : June 4, 2019
INVENTOR(S) : Pang et al.

Page 1 of 1

It is certified that error appears in the above-identified patent and that said Letters Patent is hereby corrected as shown below:

In the Claims

Claim 6, Column 37, Line 11-12: "multiple transmission time intervals (TTIs)" should read -- multiple TTIs --.

Signed and Sealed this
Twenty-fifth Day of February, 2020

Andrei Iancu
*Director of the United States Patent and Trademark Office*